Fig. 2

| RANGE | 44 | 48 | 27 | 36 | 50 | 46 | RATIO |
|---|---|---|---|---|---|---|---|
| 1 | X |  |  |  |  | X | $\frac{R_2}{S_1}$ |
| 2 |  | X |  | X |  |  | $\frac{R_1+S_1}{S_1} \cdot \frac{R_2}{R_1+R_2}$ |
| 3 |  |  |  | X | X |  | 1.00 |
| 4 |  | X |  |  | X |  | $\frac{R_2}{R_1+R_2}$ |
| R1 | X |  | X |  |  |  | $-\frac{R_2}{S_2}$ |
| R2 |  |  |  |  |  |  |  |

Fig. 4

| RANGE | 44' | 48' | 27' | 36' | 46' |  | RATIO |
|---|---|---|---|---|---|---|---|
| 1 | X |  |  |  | X |  | $\frac{R_2}{S_1}$ |
| 2 |  | X |  | X |  |  | $\frac{R_1+S_1}{S_1} \cdot \frac{R_2}{R_1+R_2}$ |
| 3 |  |  | X | X |  |  | 1.00 |
| R1 | X |  | X |  |  |  | $-\frac{R_2}{S_2}$ |
| R2 |  |  |  |  |  |  |  |

INVENTOR:
STEPAS SMALINSKAS
BY:
ATTORNEYS.

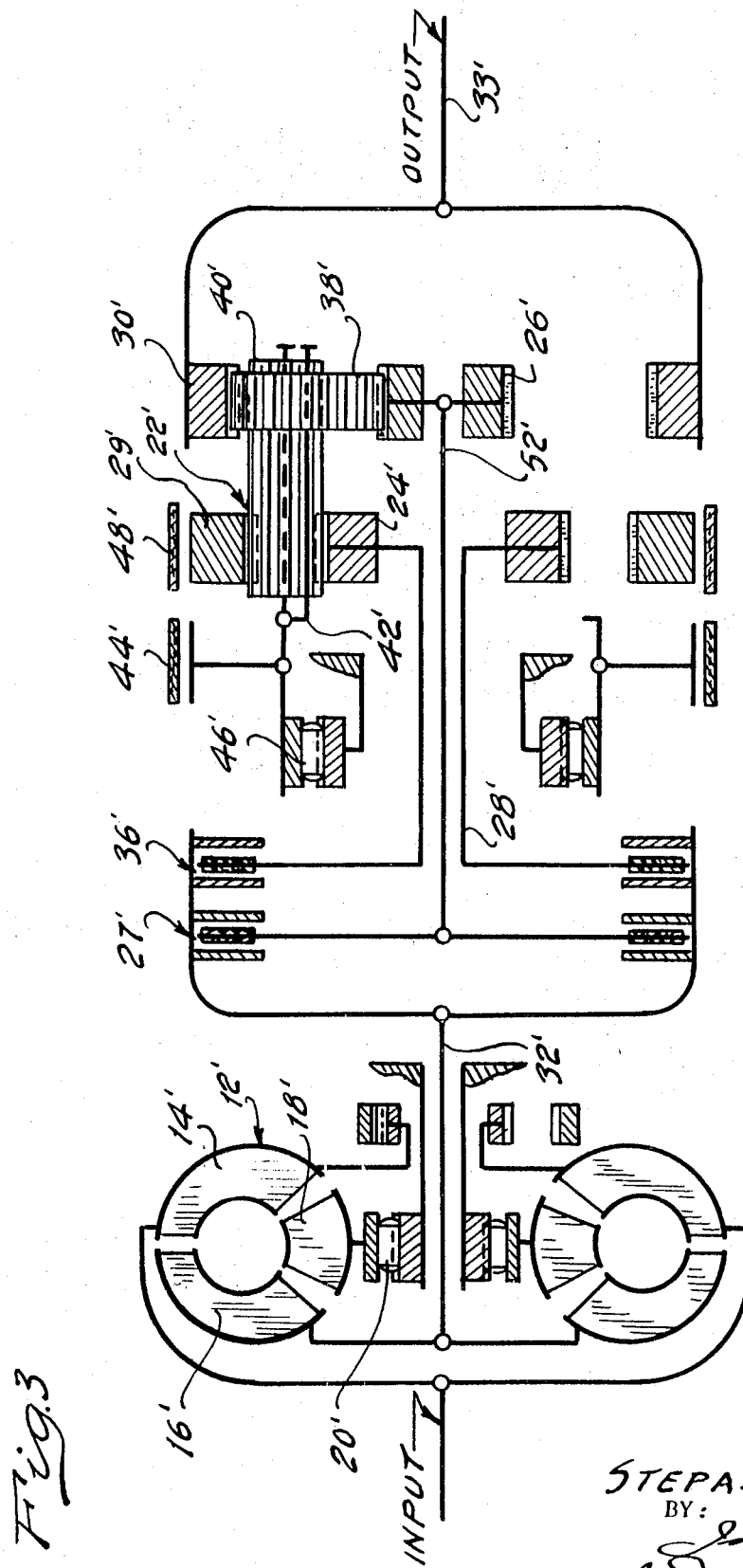

United States Patent Office 3,626,788
Patented Dec. 14, 1971

3,626,788
AUTOMATIC POWER TRANSMISSION MECHANISM WITH COMPOUND PLANETARY GEARING
Stepas Smalinskas, Southfield, Mich., assignor to Ford Motor Company, Dearborn, Mich.
Filed Jan. 13, 1970, Ser. No. 2,604
Int. Cl. F16h 57/10
U.S. Cl. 74—765                                  2 Claims

ABSTRACT OF THE DISCLOSURE

A multiple ratio power transmission mechanism having compound planetary gear elements, and clutches and brakes for controlling the relative motion of the gear elements to provide multiple, forward-driving speed ratios including an overdrive ratio wherein the numerical values for the ratios are evenly stepped and provide an increased ratio spread.

GENERAL DESCRIPTION OF THE INVENTION

My invention includes improvements in a planetary gear transmission mechanism for use in an automotive vehicle driveline. It comprises a compound planetary gear system having two sun gears, a carrier with long and short planet pinion sets and two ring gears. The sun gears act as power input gear elements, and one of the ring gears acts as the output gear element during operation in each of the ratios. The other ring gear, as well as the carrier, acts as a reaction element and each is provided with a brake for this purpose. Selectively engageable friction clutches are used to connect drivably each of the sun gears to the turbine of a hydrokinetic torque converter. A third overdrive clutch is used during overdrive operation to connect the carrier to the turbine.

BRIEF DESCRIPTION OF THE FIGURES OF THE DRAWINGS

FIG. 2 is a chart showing a clutch-and-brake engagement and release pattern for the mechanism of FIG. 1.

FIG. 3 shows a modification of the structure of FIG. 1. It includes the basic elements of the structure of FIG. 1, but the overdrive clutch has been removed.

FIG. 4 is a chart showing the clutch-and-brake engagement and release pattern for the mechanism of FIG. 3.

PARTICULAR DESCRIPTION OF THE INVENTION

Figure 1:
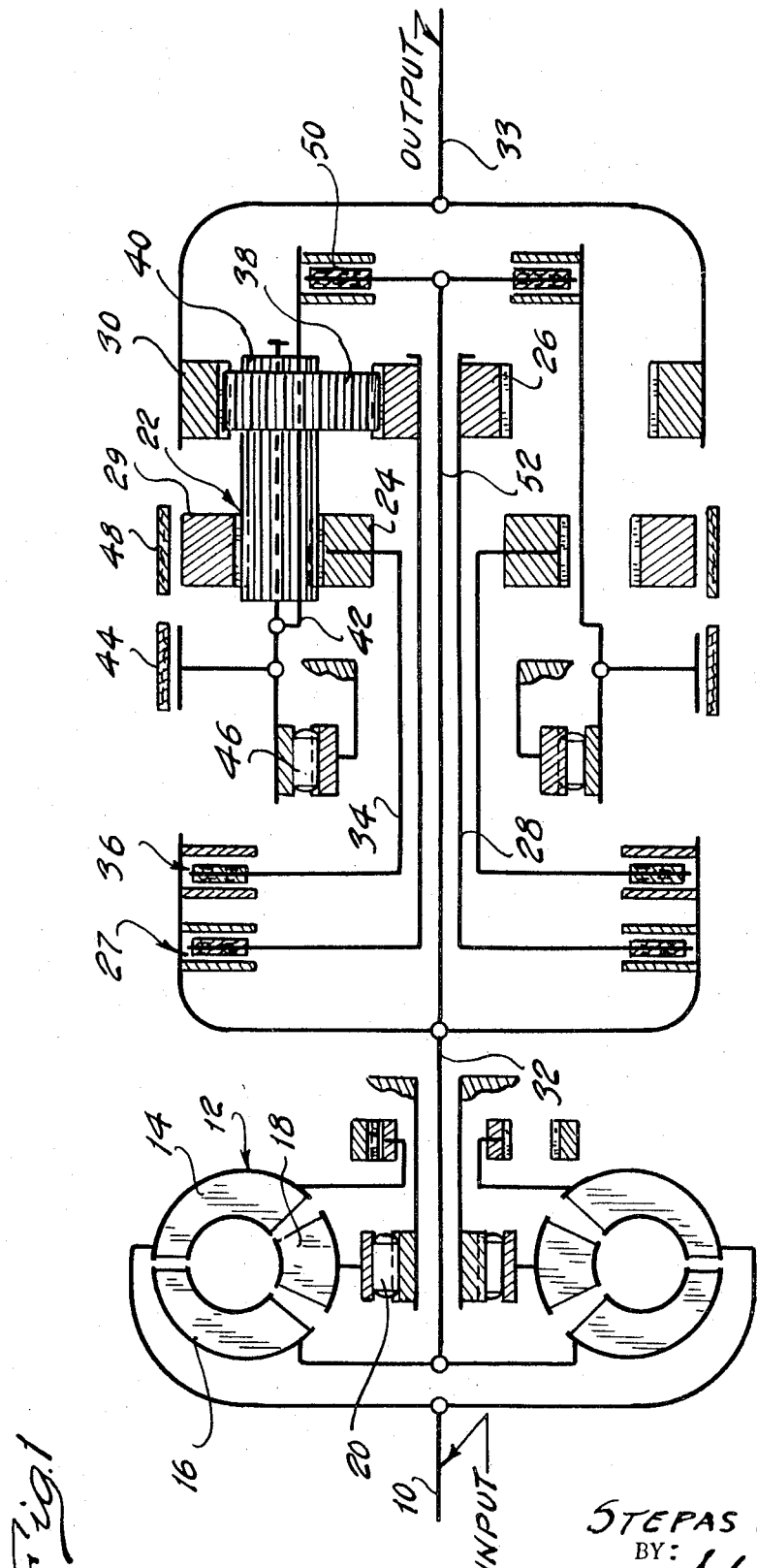
FIG. 1 shows a schematic, longitudinal cross-sectional view of the torque delivery elements of the transmission of my invention.

Reference character 10 designates one end of a crankshaft of an internal combustion engine for an automotive vehicle driveline. Numeral 12 designates a hydrokinetic torque converter which comprises a bladed impeller 14 connected drivably to the crankshaft 10. Converter 12 includes also a bladed turbine 16 situated in toroidal fluid flow relationship with respect to the impeller 14. A bladed stator 18 is situated in the torus circuit of the converter 12 between the flow exit region of the turbine 16 and the flow entrance region of the impeller 14. The blades of the stator 18 are mounted on an overrunning brake 20 which prevents rotation of the stator 18 in a direction opposite to the direction of rotation of the impeller but which permits free-wheeling motion during coupling operation in the other direction.

A compound planetary gear system is shown at 22. It includes a first sun gear 24 and a second gear 26, the diameter of the latter being less than the diameter of the former. Gear system 22 includes also a pair of ring gears 29 and 30, the latter being connected drivably to power output shaft 33 which, in turn, is connected to the vehicle traction wheels through a suitable driveshaft and differential-and-axle assembly.

Sun gear 26 is connected to sleeve shaft 28. A first clutch 27 is adapted to connect drivably the shaft 28 and the turbine shaft 32, the latter being connected directly to the turbine 16. Sun gear 24 is connected directly to sleeve shaft 34 which, in turn, is adapted to be connected to the turbine shaft 32 by a second selectively engageable friction clutch 36.

A set of short planet pinions 38, preferably three in number, mesh with ring gear 30 and sun gear 26. A set of long planet pinions 40, preferably three in number, mesh drivably with sun gear 24 and the short planet pinions 38 as well as with ring gear 29. The planet pinions sets are journaled on a common carrier 42 for rotation about their respective axes. A first friction brake 44 is adapted to anchor selectively the carrier 42. An overrunning brake 46 complements the action of the brake 44. It prevents rotation of the carrier 42 when the torque reaction of the carrier is in one direction, but it is adapted to permit free-wheeling motion of the carrier when the torque reaction is reversed. Brake 44, however, prevents rotation of the carrier in the free-wheeling direction if it is applied.

Ring gear 28 is connected to or defines a brake drum about which is positioned brake band 48. This brake band is adapted to anchor selectively the ring gear 29 during operation in the second speed ratio and the overdrive ratio.

A third friction clutch 50 is adapted to connect carrier 42 to a central torque delivery shaft 52, which in turn is connected directly to the turbine shaft 32. This clutch is engaged during overdrive operation.

All the clutches and the brakes are engaged and released by fluid pressure operated servos (not shown).

To establish low speed ratio, clutch 36 is applied. In this case, sun gear 24, which is connected through the clutch 36 to the turbine shaft 32, drives the long planet pinions, which in turn drive the short planet pinions with a motion that is opposite in direction from the direction of rotation of the sun gear 24. Short planet pinions 38 drive ring gear 30 and the power output shaft 33 with a reduced ratio in the same direction as the direction of rotation of the impeller. The carrier in these circumstances acts as the reaction member since it is anchored against rotation by the overrunning brake 46. If it is desired to maintain the carrier as the reaction point during coasting operation, it is necessary to apply the brake 44 thereby preventing rotation of the carrier 42 in either direction.

To establish intermediate speed ratio operation, ring gear 29 is allowed to function as a reaction point. This is done by engaging brake 48 while clutch 36 remains applied. Ring gear 30 and output shaft 33 now are driven with an increased speed ratio to a value that is intermediate the lowest speed ratio but less than unity.

To establish high speed ratio it is merely necessary to release the brakes and apply both clutches 36 and 50 simultaneously. This locks together for rotation in unison all the elements of the planetary gear system thereby establishing a 1 to 1 driving ratio between the output shaft 33 and the turbine 16.

To establish an overdrive ratio condition, clutch 50 is applied and brake 48 is applied. With the ring gear 29 acting as a reaction member, ring gear 30 is overdriven with respect to the sun gear 24.

Reverse drive is obtained by engaging brake 44 and clutch 27. The carrier 42 acts as a reaction member as the sun gear 26 drives pinions 38. Ring gear 30 is driven in a reverse direction by the pinions 38.

The FIG. 3 construction is similar to the FIG. 1 construction, although the clutch 50 and the torque delivery shaft 52 have been removed. The same transmission casing and the same transmission torque delivery elements can be used if it is desired to convert the mechanism to a 3-speed ratio transmission. The elements of the FIG. 3 version that have counterparts in the FIG. 1 version have been indicated by similar reference characters although prime notations have been added.

Having described preferred embodiments of my invention, what I claim and desire to secure by U.S. Letters Patent is:

1. A four speed ratio power transmission mechanism for an automotive vehicle driveline comprising compound planetary gearing having a power input shaft and a power output shaft, a first sun gear, a second sun gear having a pitch diameter less than the pitch diameter of said first sun gear, an intermediate shaft connected to said power input shaft and extending through said sun gears, a first sleeve shaft connected to said second sun gear and surrounding said intermediate shaft, a second sleeve shaft connected to said first sun gear and surrounding said first sleeve shaft, first selectively engageable clutch means for connecting said power input shaft to said first sleeve shaft, second selectively engageable clutch means for connecting said power input shaft to said second sleeve shaft, said first sun gear being situated between said second sun gear and said first and second clutch means, first and second ring gears, a first set of planet pinions meshing with said second sun gear and said second ring gear, a second set of planet pinions meshing with said first set of planet pinions, with said first sun gear and with said first ring gear, a common carrier for journaling rotatably each set of planet pinions, third selectively engageable clutch means for connecting said carrier to said intermediate shaft, first brake means for anchoring said carrier to provide a torque reaction point during low speed ratio operation and reverse drive operation, and second brake means for anchoring said first ring gear during second ratio operation and fourth speed ratio operation, said second clutch means being engaged during operation in each of the first, second and third forward drive speed ratios, said first clutch means and said first brake means being engaged during reverse drive operation.

2. The combination set forth in claim 1 wherein said first brake means includes an overrunning brake having a pair of races one of which is connected to a stationary portion of said mechanism and the other of which is connected to said carrier.

References Cited

UNITED STATES PATENTS

| | | | |
|---|---|---|---|
| 2,220,174 | 11/1940 | Ravigneaux | 74—759 X |
| 2,725,762 | 12/1955 | Hettinger, Jr. et al. | 74—688 |
| 2,761,333 | 9/1956 | Ravigneaux | 74—759 |
| 2,847,877 | 8/1958 | Ravigneaux | 74—759 |

FOREIGN PATENTS

| | | | |
|---|---|---|---|
| 1,042,623 | 6/1953 | France | 74—759 |

WILLIAM L. FREEH, Primary Examiner

T. C. PERRY, Assistant Examiner